United States Patent
Wang et al.

(10) Patent No.: US 12,061,317 B2
(45) Date of Patent: Aug. 13, 2024

(54) OPTICAL LENS ASSEMBLY

(71) Applicant: NINGBO SUNNY AUTOMOTIVE OPTECH CO., LTD, Ningbo (CN)

(72) Inventors: Dongfang Wang, Ningbo (CN); Bo Yao, Ningbo (CN); Ludong Zhang, Ningbo (CN)

(73) Assignee: NINGBO SUNNY AUTOMOTIVE OPTECH CO., LTD, Ningbo (CN)

( * ) Notice: Subject to any disclaimer, the term of this patent is extended or adjusted under 35 U.S.C. 154(b) by 880 days.

(21) Appl. No.: 17/081,042

(22) Filed: Oct. 27, 2020

(65) Prior Publication Data

US 2021/0063705 A1 Mar. 4, 2021

Related U.S. Application Data

(63) Continuation of application No. PCT/CN2019/079983, filed on Mar. 28, 2019.

(30) Foreign Application Priority Data

Apr. 28, 2018 (CN) .......................... 201810397943.0

(51) Int. Cl.
*G02B 13/18* (2006.01)
*G02B 9/62* (2006.01)
*G02B 13/00* (2006.01)

(52) U.S. Cl.
CPC ........... *G02B 13/0045* (2013.01); *G02B 9/62* (2013.01)

(58) Field of Classification Search
CPC . G02B 9/00; G02B 9/60; G02B 13/00; G02B 13/001; G02B 13/0015;
(Continued)

(56) References Cited

U.S. PATENT DOCUMENTS 7,859,770 B2 * 12/2010 Su .......................... G02B 13/18
359/708
2014/0198395 A1 * 7/2014 Ryu ................... G02B 13/0045
359/713
(Continued)

FOREIGN PATENT DOCUMENTS

CN 102369471 A 3/2012
CN 107065147 A 8/2017
(Continued)

OTHER PUBLICATIONS

Machine English translation of the Chinese reference No. 107577030 which was published in Jan. 12, 2018.*
(Continued)

*Primary Examiner* — Thong Q Nguyen
(74) *Attorney, Agent, or Firm* — HAUPTMAN HAM, LLP

(57) ABSTRACT

The present disclosure discloses an optical lens assembly which includes, sequentially from an object side to an image side along an optical axis, a first lens, a second lens, a third lens, a fourth lens, a fifth lens and a sixth lens. The first lens may have negative refractive power, a convex object-side surface, and a concave image-side surface. The second lens may have negative refractive power, a convex object-side surface, and a concave image-side surface. The third lens may have positive refractive power, and both object-side and image-side surfaces thereof are convex. The fourth lens may have positive refractive power, and both object-side and image-side surfaces thereof are convex. The fifth lens may have negative refractive power, and both object-side and image-side surfaces thereof are concave. The sixth lens may have positive refractive power, and both object-side and image-side surfaces thereof are convex.

19 Claims, 2 Drawing Sheets

(58) Field of Classification Search
CPC .......................... G02B 13/002; G02B 13/0045; G02B 13/006; G02B 13/008; G02B 13/02; G02B 13/04; G02B 13/14; G02B 13/18
USPC ................ 359/713, 749, 752, 754, 756–758, 359/761–762
See application file for complete search history.

(56) References Cited

U.S. PATENT DOCUMENTS

| | | | | |
|---|---|---|---|---|
| 2015/0185452 | A1* | 7/2015 | Hsu | G02B 13/06 359/728 |
| 2015/0309289 | A1* | 10/2015 | Nakamura | A61B 1/00174 359/740 |
| 2018/0335613 | A1* | 11/2018 | Nakamura | G02B 13/06 |

FOREIGN PATENT DOCUMENTS

| | | |
|---|---|---|
| CN | 107329241 A | 11/2017 |
| CN | 107436476 A | 12/2017 |
| CN | 107577030 A | 1/2018 |
| CN | 108957709 A | 12/2018 |
| EP | 1734393 A1 | 12/2006 |
| JP | 2007-108614 A | 4/2007 |
| JP | 2013-73160 A | 4/2013 |

OTHER PUBLICATIONS

International Search Report issued in corresponding International Application No. PCT/CN2019/079983, mailed Jun. 6, 2019; State Intellectual Property Office of the P.R. China, Beijing, China, 5 pgs.
First Office Action in Corresponding Chinese Application No. 201810397943.0, mailed May 29, 2020; 21 pgs.

* cited by examiner

OPTICAL LENS ASSEMBLY

CROSS-REFERENCE TO RELATED APPLICATIONS

The present patent application is a continuation of International Application No. PCT/CN2019/079983, filed on Mar. 28, 2019, which claims priority to Chinese Patent Application No. 201810397943.0, filed before the China National Intellectual Property Administration (CNIPA) on Apr. 28, 2018. Both of the aforementioned patent applications are hereby incorporated by reference in their entireties.

TECHNICAL FIELD

The present disclosure relates to an optical lens assembly, and more specifically, relates to an optical lens assembly including six lenses.

BACKGROUND

With the development of technology, the performance requirements of optical lens assemblies are getting higher and higher. Surveillance lenses or automotive lenses usually need to meet the requirements of high resolution and low aberration. Generally, the resolution can be improved by increasing the number of lenses, and aspheric lenses are usually used to correct aberrations. In the prior art, high resolution can be obtained by increasing the number of lenses to 6-7 or more, but this will affect the realization of miniaturization and low-cost effects. When an aspheric lens is used to correct aberrations, if the aspheric lens is a plastic aspheric lens, due to the large thermal expansion coefficient of the plastic, there is a problem that the out-of-focus image plane is blurred due to temperature changes. In addition, if the aspheric lens is a glass aspheric lens, the cost is too high.

Therefore, it is necessary to design an optical lens assembly that meets the performance of miniaturization, high pixels, long back focal length, and low cost, so as to better meet the requirements of monitoring or on-board environments.

SUMMARY

The present disclosure provides an optical lens assembly that is applicable to on-board installation and at least overcomes or partially overcomes at least one of the above deficiencies of the prior art.

In one aspect, the present disclosure provides an optical lens assembly, which may include, sequentially from an object side to an image side along an optical axis, a first lens, a second lens, a third lens, a fourth lens, a fifth lens and a sixth lens. The first lens may have negative refractive power, an object-side surface of the first lens is a convex surface, and an image-side surface of the first lens is a concave surface. The second lens may have negative refractive power, an object-side surface of the second lens is a convex surface, and an image-side surface of the second lens is a concave surface. The third lens may have positive refractive power, and both of an object-side surface and an image-side surface of the third lens are convex surfaces. The fourth lens may have positive refractive power, and both of an object-side surface and an image-side surface of the fourth lens are convex surfaces. The fifth lens may have negative refractive power, and both of an object-side surface and an image-side surface of the fifth lens are concave surfaces. The sixth lens may have positive refractive power, and both of an object-side surface and an image-side surface of the sixth lens are convex surfaces.

In an embodiment, the fourth lens, the fifth lens and the sixth lens may be cemented to form a triple cemented lens.

In an embodiment, any one or all of the first to sixth lenses may be a glass lens. In other words, at least one of the first to sixth lenses may be a glass lens. In some embodiments, all of the first to sixth lenses may be glass lenses.

In an embodiment, at least one of the second lens, the third lens, and the sixth lens may be an aspheric lens.

In an embodiment, $D/H/FOV \le 0.025/\text{degree}$ may be satisfied, where FOV is a maximum field-of-view of the optical lens assembly, D is a maximum effective aperture diameter of the object-side surface of the first lens corresponding to the maximum field-of-view of the optical lens assembly, and H is an image height corresponding to the maximum field-of-view of the optical lens assembly.

In an embodiment, $BFL/TTL \ge 0.15$ may be satisfied, where BFL is a distance along the optical axis from a center of the image-side surface of the sixth lens to an imaging plane of the optical lens assembly, and TTL is a distance along the optical axis from a center of the object-side surface of the first lens to the imaging plane of the optical lens assembly.

In an embodiment, $TTL/F \le 7.5$ may be satisfied, where TTL is a distance along the optical axis from a center of the object-side surface of the first lens to an imaging plane of the optical lens assembly, and F is a total focal length of the optical lens assembly.

In another aspect, the present disclosure provides an optical lens assembly, which may include, sequentially from an object side to an image side along an optical axis, a first lens, a second lens, a third lens, a fourth lens, a fifth lens and a sixth lens. Each of the first lens, the second lens, and the fifth lens may have negative refractive power. Each of the third lens, the fourth lens and the sixth lens may have positive refractive power. The fourth lens, the fifth lens and the sixth lens may be cemented to form a triple cemented lens. A distance TTL along the optical axis from a center of the object-side surface of the first lens to an imaging plane of the optical lens assembly and a total focal length F of the optical lens assembly may satisfy $TTL/F \le 7.5$.

In an embodiment, an object-side surface of the first lens may be a convex surface, and an image-side surface of the first lens may be a concave surface.

In an embodiment, an object-side surface of the second lens may be a convex surface, and an image-side surface of the second lens may be a concave surface.

In an embodiment, both of an object-side surface and an image-side surface of the third lens may be convex surfaces.

In an embodiment, both of an object-side surface and an image-side surface of the fourth lens may be convex surfaces.

In an embodiment, both of an object-side surface and an image-side surface of the fifth lens may be concave surfaces.

In an embodiment, both of an object-side surface and an image-side surface of the sixth lens may be convex surfaces.

In an embodiment, any one or all of the first to sixth lenses may be a glass lens.

In an embodiment, at least one of the second lens, the third lens, and the sixth lens may be an aspheric lens.

In an embodiment, $D/H/FOV \le 0.025/\text{degree}$ may be satisfied, where FOV is a maximum field-of-view of the optical lens assembly, D is a maximum effective aperture diameter of an object-side surface of the first lens corresponding to the maximum field-of-view of the optical lens assembly, and H is an image height corresponding to the maximum field-of-view of the optical lens assembly.

In an embodiment, BFL/TTL≥0.15 may be satisfied, where BFL is a distance along the optical axis from a center of an image-side surface of the sixth lens to an imaging plane of the optical lens assembly, and TTL is a distance along the optical axis from a center of an object-side surface of the first lens to the imaging plane of the optical lens assembly.

The present disclosure employs, for example, six lenses, and the optical lens assembly has at least one advantageous effect such as miniaturization, high pixels, low cost, long back focal length, good temperature performance, low sensitivity, and ease of assembly and the like by optimizing the shape of the lens, properly distributing the refractive power of each lens and forming a cemented lens and the like.

BRIEF DESCRIPTION OF THE DRAWINGS

Other features, objects, and advantages of the present disclosure will become more apparent from the following detailed description of non-limiting embodiments, taken in conjunction with the accompanying drawings. In the drawings.

DETAILED DESCRIPTION OF EMBODIMENTS

Figure 1:
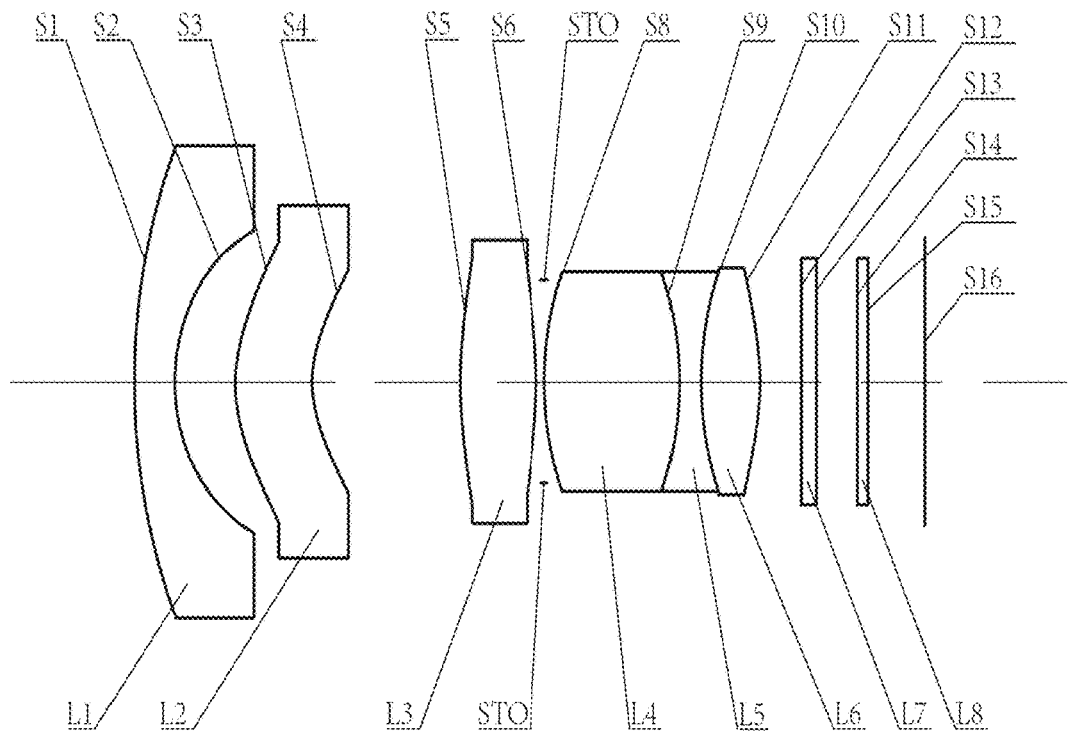
FIG. 1 is a schematic structural diagram showing an optical lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, without departing from the teachings of the present disclosure, a first lens discussed below may also be referred to as a second lens or a third lens, and a first cemented lens may also be referred to as a second cemented lens.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region. If a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical lens assembly according to exemplary embodiments of the present disclosure includes, for example, six lenses having refractive power, i.e., a first lens, a second lens, a third lens, a fourth lens, a fifth lens and a sixth lens. The six lenses are sequentially arranged from an object side to an image side along an optical axis.

An optical lens assembly according to exemplary embodiments of the present disclosure may further include a photosensitive element disposed on an imaging plane. Optionally, the photosensitive element disposed on the imaging plane may be a Charge-Coupled Device element (CCD) or a Complementary Metal-Oxide Semiconductor element (CMOS).

The first lens may have negative refractive power, an object-side surface thereof may be a convex surface, and an image-side surface thereof may be a concave surface. Designing the first lens as a meniscus shape convex to the object can collect as much light as possible from a large field of view and make the light enter the rear optical system. In practical applications, since the outdoor installation and use environment of the on-board lenses is relatively harsh, for example, the on-board lenses will be used in severe weather such as rain or snow, the design of the meniscus shape convex to the object is conducive to the sliding of water droplets and can reduce the impact on imaging. Further, the first lens may be a glass aspheric lens, thereby further improving the image quality and reducing the front end aperture. At the same time, the first lens may use a material with high refractive index (for example, Nd1≥1.7), which can help reduce the aperture of the front end and improve the image quality.

The second lens may have negative refractive power, an object-side surface thereof may be a convex surface, and an image-side surface thereof may be a concave surface. The second lens can be used to diverge light and make the light transition smoothly. At the same time, the second lens helps to collect light in a large field of view, thereby improving the illuminance of the system.

The third lens may have positive refractive power, and both of an object-side surface and an image-side surface thereof may be convex surfaces. The third lens can be used to converge the light so that the light diverged by the second lens can smoothly enter the rear optical system. The refractive power of the third lens is positive, which helps to compensate the spherical aberrations introduced by the first two lenses.

The fourth lens may have positive refractive power, and both of an object-side surface and an image-side surface thereof may be convex surfaces.

The fifth lens may have negative refractive power, and both of an object-side surface and an image-side surface thereof may be concave surfaces.

The sixth lens may have positive refractive power, and both of an object-side surface and an image-side surface thereof may be convex surfaces.

As is known to those skilled in the art, a cemented lens may be used to minimize aberration or eliminate aberration. Using a cemented lens in an optical lens assembly may improve image quality and reduce reflection losses of light energy, thereby improving the imaging sharpness of lens assembly. In addition, the use of a cemented lens may also simplify assembly process in the lens assembly manufacturing process.

In an exemplary embodiment, the fourth lens, the fifth lens, and the sixth lens may be cemented into a triple cemented lens by cementing the image-side surface of the fourth lens and the object-side surface of the fifth lens and cementing the image-side surface of the fifth lens and the object-side surface of the sixth lens. Using the triple cemented lens may help eliminate chromatic aberration, reduce the tolerance sensitivity of the system, and achieve high resolution. At the same time, the cemented lens may also generate residual chromatic aberration to compensate the overall chromatic aberration of the optical system. The cementing of the lenses may also omit the air gap among the three lenses and reduce the total length of the system, thereby making the overall optical system compact to meet the needs of system miniaturization. In addition, the cementing of the lenses will reduce the assembly parts required for the three lenses, reduce the cost, and reduce the tolerance sensitivity issues (such as tilt or eccentricity) of the lens unit. Further, the cementing of the lenses helps reduce the loss of light caused by reflections between the lenses.

In an exemplary embodiment, a stop for limiting the light beam may be disposed between, for example, the third lens and the fourth lens to further improve the imaging quality of the lens assembly. Disposing the stop between the third lens and the triple cemented lens may converge the light beams before and after the stop, thereby shortening the total length of the optical system and reducing the aperture of the front and rear lens groups.

In an exemplary embodiment, a maximum field-of-view FOV of the optical lens assembly, a maximum effective aperture diameter D of an object-side surface of the first lens corresponding to the maximum field-of-view of the optical lens assembly and an image height H corresponding to the maximum field-of-view of the optical lens assembly may satisfy: $D/H/FOV \leq 0.025$. More desirable, $D/H/FOV \leq 0.02$ may be further satisfied. When the conditional expression $D/H/FOV \leq 0.025$ is satisfied, a small front end aperture of the lens assembly may be ensured.

In an exemplary embodiment, an optical back focal length BFL of the optical lens assembly and a total track length TTL of the optical lens assembly may satisfy $BFL/TTL \geq 0.15$. More desirable, $BFL/TTL \geq 0.18$ may be further satisfied. Cooperating with the overall structure of the optical lens, a back focal length setting that satisfies $BFL/TTL \geq 0.15$ can facilitate the assembly of the optical lens assembly.

In an exemplary embodiment, a total track length TTL of the optical lens assembly and a total focal length F of the optical lens assembly may satisfy: $TTL/F \leq 7.5$. More desirable, $TTL/F \leq 7$ may be further satisfied. When the conditional expression $TTL/F \leq 7.5$ is satisfied, the miniaturization of the lens assembly may be further achieved.

In an exemplary embodiment, the lens used in the optical lens assembly may be a plastic lens or a glass lens. Since plastic lenses have a large thermal expansion coefficient, plastic lenses will cause a greater change in the optical back focal length of the lens assembly when the ambient temperature in which the lens assembly is located changes greatly. The use of glass lenses can reduce the impact of temperature on lens performance. Desirably, the first to sixth lenses of the optical lens assembly according to the present disclosure may use glass lenses to enhance the performance of the lens under high or low temperature conditions, reduce the impact of the environment on the overall system, and improve the overall performance of the optical lens assembly.

In an exemplary embodiment, at least one of the second lens, the third lens, and the sixth lens may be an aspheric lens. Aspheric lenses are characterized by a continuous change in curvature from the center of the lens to the periphery. Unlike spherical lenses that have a constant curvature from the center of the lens to the periphery, the aspheric lenses have better radius of curvature characteristics and have the advantages of improving distortion and improving astigmatic aberration. With the aspheric lens, the aberrations that occur during imaging may be eliminated as much as possible, thereby the imaging quality of the lens may be improved.

By reasonably setting the shape and refractive power of lenses, the optical lens assembly according to the above embodiments of the present disclosure may achieve a long back focal length, thereby facilitating assembly. In addition, the use of aspheric lenses can further improve the resolution quality. By using the triple cemented lens, the overall structure of the optical system can be made compact, while the chromatic aberration and tolerance sensitivity of the system can be effectively reduced, and the assembly is convenient. The use of glass material in the lens may enhance the performance of the lens in high or low temperature conditions and improve the temperature stability of the lens.

However, it will be understood by those skilled in the art that the number of lenses constituting the optical lens assembly may be varied to achieve the various results and advantages described in this specification without departing from the technical solution claimed by the present disclosure. For example, although some embodiments are described by taking six lenses as an example, the optical lens assembly is not limited to include six lenses. The optical lens assembly may also include other numbers of lenses if desired.

Some specific examples of an optical lens assembly applicable to the above embodiment will be further described below with reference to the accompanying drawings.

Example 1

An optical lens assembly according to Example 1 of the present disclosure is described below with reference to FIG. 1. FIG. 1 shows a schematic structural diagram of the optical lens assembly according to Example 1 of the present disclosure.

As shown in FIG. 1, the optical lens assembly includes a first lens L1, a second lens L2, a third lens L3, a fourth lens L4, a fifth lens L5 and a sixth lens L6, which are sequentially arranged along an optical axis from an object side to an imaging side of the optical lens assembly.

The first lens L1 is a meniscus lens having negative refractive power, and an object-side surface S1 thereof is a convex surface and an image-side surface S2 thereof is a concave surface.

The second lens L2 is a meniscus lens having negative refractive power, and an object-side surface S3 thereof is a convex surface and an image-side surface S4 thereof is a concave surface. In addition, the second lens L2 is an aspheric lens, and its object-side surface S3 and image-side surface S4 are both aspheric.

The third lens L3 is a biconvex lens having positive refractive power, and an object-side surface S5 thereof is a convex surface and an image-side surface S6 thereof is a convex surface. In addition, the third lens L3 is an aspheric lens, and its object-side surface S5 and image-side surface S6 are both aspheric.

The fourth lens L4 is a biconvex lens having positive refractive power, and an object-side surface S8 thereof is a convex surface and an image-side surface S9 thereof is a convex surface. The fifth lens L5 is a biconcave lens having negative refractive power, and an object-side surface S9 thereof is a concave surface and an image-side surface S10 thereof is a concave surface. The sixth lens L6 is a biconvex lens having positive refractive power, and an object-side surface S10 thereof is a convex surface and an image-side surface S11 thereof is a convex surface. In addition, the sixth lens L6 is an aspheric lens, and its image-side surface S11 is aspheric. The fourth lens L4, the fifth lens L5, and the sixth lens L6 are cemented to form a triple cemented lens.

Optionally, the optical lens assembly may further include an optical filter L7 having an object-side surface S12 and an image-side surface S13, and a protective lens L8 having an object-side surface S14 and an image-side surface S15. The optical filter L7 may be used to correct color deviations. The protective lens L8 may be used to protect an image sensing chip located on an imaging plane S16. Light from an object sequentially passes through the respective surfaces S1 to S15 and is finally imaged on the imaging plane S16.

In the optical lens assembly of the present example, a stop STO may be provided between the third lens L3 and the fourth lens L4 to improve imaging quality.

Table 1 shows radius of curvature R, thickness T, refractive index Nd and Abbe number Vd of each lens of the optical lens assembly in Example 1, wherein the units for the radius of curvature R and the thickness T are millimeter (mm).

TABLE 1

| Surface No. | Radius of Curvature R | Thickness T | Refractive Index Nd | Abbe Number Vd |
|---|---|---|---|---|
| S1 | 17.0643 | 1.5000 | 1.80 | 46.6 |
| S2 | 4.9924 | 2.6072 | | |
| S3 | 6.5000 | 2.1808 | 1.81 | 41.0 |
| S4 | 3.7016 | 5.5863 | | |
| S5 | 14.2912 | 3.2000 | 1.74 | 49.3 |
| S6 | −9.6682 | 0.1300 | | |
| STO | Infinite | 0.0141 | | |
| S8 | 8.5000 | 5.0000 | 1.50 | 81.6 |
| S9 | −8.5000 | 0.8000 | 1.81 | 22.7 |
| S10 | 8.8181 | 1.9125 | 1.52 | 64.2 |
| S11 | −11.5649 | 1.8000 | | |
| S12 | Infinite | 0.5500 | 1.52 | 64.2 |
| S13 | Infinite | 1.5131 | | |
| S14 | Infinite | 0.4000 | 1.52 | 64.2 |
| S15 | Infinite | 2.8194 | | |
| S16 | Infinite | | | |

The example employs six lenses as an example. By properly distributing the refractive power and surface of each lens, the center thickness of each lens, and the air gap between the lenses, the lens assembly may have at least one of the beneficial effects of miniaturization, compensated aberrations, low sensitivity, high pixels, low cost, long back focal length, and good temperature performance and the like. The surface shape Z of each aspheric is defined by the following formula:

$$Z(h) = \frac{ch^2}{1 + \sqrt{1 - (k+1)c^2 h^2}} + Ah^4 + Bh^6 + Ch^8 + Dh^{10} + Eh^{12} \qquad (1)$$

Where, Z is the sag—the axis-component of the displacement of the surface from the aspheric vertex, when the surface is at height H from the optical axis; c is a paraxial curvature of the aspheric, c=1/R (that is, the paraxial curvature c is reciprocal of the radius of curvature R in the above Table 1); K is a conic coefficient; A, B, C, D, E are high-order coefficients. Table 2 below shows the conic coefficient K and the high-order coefficients A, B, C, D and E applicable to aspheric surfaces S3, S4, S5, S6 and S11 in Example 1.

TABLE 2

| Surface No. | K | A | B | C | D | E |
|---|---|---|---|---|---|---|
| S3 | −1.0118 | 4.0232E−04 | −3.52E−05 | 9.29E−07 | −1.15E−07 | 1.92E−09 |
| S4 | −0.9914 | 2.1622E−03 | −3.4690E−05 | −4.6042E−06 | −4.5633E−07 | 2.1895E−08 |
| S5 | 2.7259 | 2.7601E−04 | 2.3606E−05 | −8.9983E−07 | 6.3617E−08 | 3.4559E−10 |
| S6 | −8.8025 | −7.6491E−04 | 3.3367E−05 | 3.7240E−06 | −3.7230E−07 | 1.4745E−08 |
| S11 | −0.2369 | 1.3997E−03 | −7.1431E−05 | 1.3586E−05 | −9.9700E−07 | 2.8015E−08 |

Table 3 shows an optical back focal length BFL of the optical lens assembly (i.e. a distance along the optical axis from a center of the image-side surface S11 of the sixth lens L6, the last lens, to the imaging plane S16), a total focal length F of the optical lens assembly, a total track length TTL of the optical lens assembly (i.e., a distance along the optical axis from a center of the object-side surface S1 of the first lens L1 to the imaging plane S16), a maximum field-of-view FOV of the optical lens assembly, a maximum effective aperture diameter D of the object-side surface S1 of the first lens L1 corresponding to the maximum field-of-view of the optical lens assembly, and an image height H corresponding to the maximum field-of-view of the optical lens assembly in Example 1.

TABLE 3

| Parameters | BFL (mm) | F (mm) | TTL (mm) | FOV (°) | D (mm) | H (mm) |
|---|---|---|---|---|---|---|
| Value | 7.082 | 4.941 | 30.013 | 120.6 | 14.972 | 9.196 |

In this example, the maximum field-of-view FOV of the optical lens assembly, the maximum effective aperture diameter D of the object-side surface S1 of the first lens L1 corresponding to the maximum field-of-view of the optical lens assembly, and the image height H corresponding to the maximum field-of-view of the optical lens assembly satisfy D/H/FOV=0.014. The optical back focal length BFL of the optical lens assembly and the total track length TTL of the optical lens assembly satisfy BFL/TTL=0.236. The total track length TTL of the optical lens assembly and the total focal length F of the optical lens assembly satisfy TTL/F=6.074.

Example 2

Figure 2:
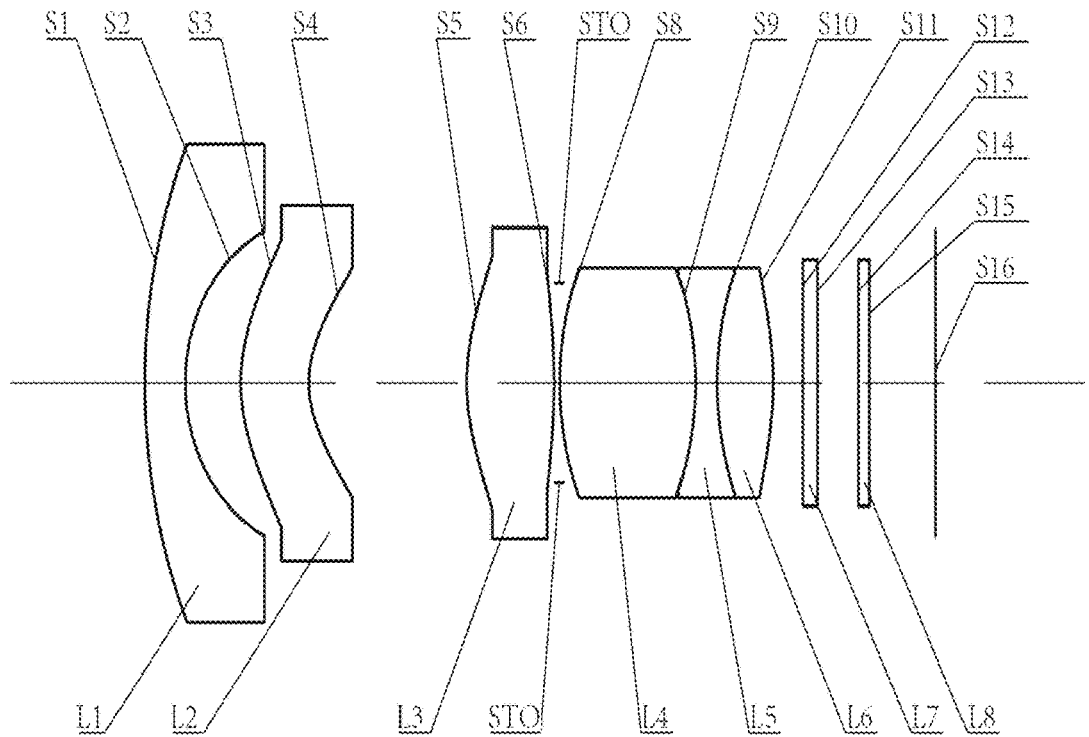
FIG. 2 is a schematic structural diagram showing an optical lens assembly according to Example 2 of the present disclosure.

An optical lens assembly according to Example 2 of the present disclosure is described below with reference to FIG. 2. In this example and the following examples, for the purpose of brevity, the description of parts similar to those in Example 1 will be omitted. FIG. 2 is a schematic structural view of the optical lens assembly according to Example 2 of the present disclosure.

As shown in FIG. 2, the optical lens assembly includes a first lens L1, a second lens L2, a third lens L3, a fourth lens L4, a fifth lens L5 and a sixth lens L6, which are sequentially arranged along an optical axis from an object side to an imaging side of the optical lens assembly.

The first lens L1 is a meniscus lens having negative refractive power, and an object-side surface S1 thereof is a convex surface and an image-side surface S2 thereof is a concave surface.

The second lens L2 is a meniscus lens having negative refractive power, and an object-side surface S3 thereof is a convex surface and an image-side surface S4 thereof is a concave surface. In addition, the second lens L2 is an aspheric lens, and its object-side surface S3 and image-side surface S4 are both aspheric.

The third lens L3 is a biconvex lens having positive refractive power, and an object-side surface S5 thereof is a convex surface and an image-side surface S6 thereof is a convex surface. In addition, the third lens L3 is an aspheric lens, and its object-side surface S5 and image-side surface S6 are both aspheric.

The fourth lens L4 is a biconvex lens having positive refractive power, and an object-side surface S8 thereof is a convex surface and an image-side surface S9 thereof is a convex surface. The fifth lens L5 is a biconcave lens having negative refractive power, and an object-side surface S9 thereof is a concave surface and an image-side surface S10 thereof is a concave surface. The sixth lens L6 is a biconvex lens having positive refractive power, and an object-side surface S10 thereof is a convex surface and an image-side surface S11 thereof is a convex surface. In addition, the sixth lens L6 is an aspheric lens, and its image-side surface S11 is aspheric. The fourth lens L4, the fifth lens L5, and the sixth lens L6 are cemented to form a triple cemented lens.

Optionally, the optical lens assembly may further include an optical filter L7 having an object-side surface S12 and an image-side surface S13, and a protective lens L8 having an object-side surface S14 and an image-side surface S15. The optical filter L7 may be used to correct color deviations. The protective lens L8 may be used to protect an image sensing chip located on an imaging plane S16. Light from an object sequentially passes through the respective surfaces S1 to S15 and is finally imaged on the imaging plane S16.

In the optical lens assembly of the present example, a stop STO may be provided between the third lens L3 and the fourth lens L4 to improve imaging quality.

Table 4 shows radius of curvature R, thickness T, refractive index Nd and Abbe number Vd of each lens of the optical lens assembly in Example 2, wherein the units for the radius of curvature R and the thickness T are millimeter (mm). Table 5 below shows the conic coefficient K and the high-order coefficients A, B, C, D and E applicable to aspheric surfaces S3, S4, S5, S6 and S11 in Example 1. Table 6 shows an optical back focal length BFL of the optical lens assembly (i.e. a distance along the optical axis from a center of the image-side surface S11 of the sixth lens L6, the last lens, to the imaging plane S16), a total focal length F of the optical lens assembly, a total track length TTL of the optical lens assembly (i.e., a distance along the optical axis from a center of the object-side surface S1 of the first lens L1 to the imaging plane S16), a maximum field-of-view FOV of the optical lens assembly, a maximum effective aperture diameter D of the object-side surface S1 of the first lens L1 corresponding to the maximum field-of-view of the optical lens assembly, and an image height H corresponding to the maximum field-of-view of the optical lens assembly in Example 2.

TABLE 4

| Surface No. | Radius of Curvature R | Thickness T | Refractive Index Nd | Abbe Number Vd |
|---|---|---|---|---|
| S1 | 17.0643 | 1.5000 | 1.80 | 46.57 |
| S2 | 4.9924 | 2.2908 | | |
| S3 | 6.5000 | 2.1808 | 1.81 | 41.00 |
| S4 | 3.7016 | 5.9783 | | |
| S5 | 11.4340 | 3.2988 | 1.74 | 49.34 |
| S6 | −11.4340 | 0.1214 | | |
| STO | Infinite | 0.2641 | | |
| S8 | 8.5000 | 5.0000 | 1.50 | 81.59 |
| S9 | −8.5000 | 0.8000 | 1.81 | 22.69 |
| S10 | 8.8181 | 1.9125 | 1.52 | 64.21 |
| S11 | −11.5649 | 1.0035 | | |
| S12 | Infinite | 0.5500 | 1.62 | 63.42 |
| S13 | Infinite | 1.5131 | | |
| S14 | Infinite | 0.4000 | 1.52 | 64.21 |
| S15 | Infinite | 3.5594 | | |
| S16 | Infinite | | | |

TABLE 5

| Surface No. | K | A | B | C | D | E |
|---|---|---|---|---|---|---|
| S3 | −1.0118 | 4.02E−04 | −3.52E−05 | 9.29E−07 | −1.15E−07 | 1.82E−09 |
| S4 | −0.9914 | 2.16E−03 | −3.47E−05 | −4.60E−06 | −4.56E−07 | 2.69E−08 |
| S5 | 6.4835 | −4.07E−05 | 6.76E−05 | −9.86E−06 | 7.38E−07 | −2.29E−08 |
| S6 | −8.8025 | 1.35E−04 | −2.68E−05 | 1.77E−05 | −1.86E−06 | 7.75E−08 |
| S11 | 0.4949 | 1.33E−03 | −6.90E−05 | 1.36E−05 | −1.17E−06 | 3.10E−08 |

TABLE 6

| Parameters | BFL (mm) | F (mm) | TTL (mm) | FOV (°) | D (mm) | H (mm) |
|---|---|---|---|---|---|---|
| Value | 7.026 | 4.881 | 30.373 | 120.2 | 14.756 | 8.978 |

In this example, the maximum field-of-view FOV of the optical lens assembly, the maximum effective aperture diameter D of the object-side surface S1 of the first lens L1 corresponding to the maximum field-of-view of the optical lens assembly, and the image height H corresponding to the maximum field-of-view of the optical lens assembly satisfy D/H/FOV=0.014. The optical back focal length BFL of the optical lens assembly and the total track length TTL of the optical lens assembly satisfy BFL/TTL=0.231. The total track length TTL of the optical lens assembly and the total focal length F of the optical lens assembly satisfy TTL/F=6.222.

Example 3

Figure 3:
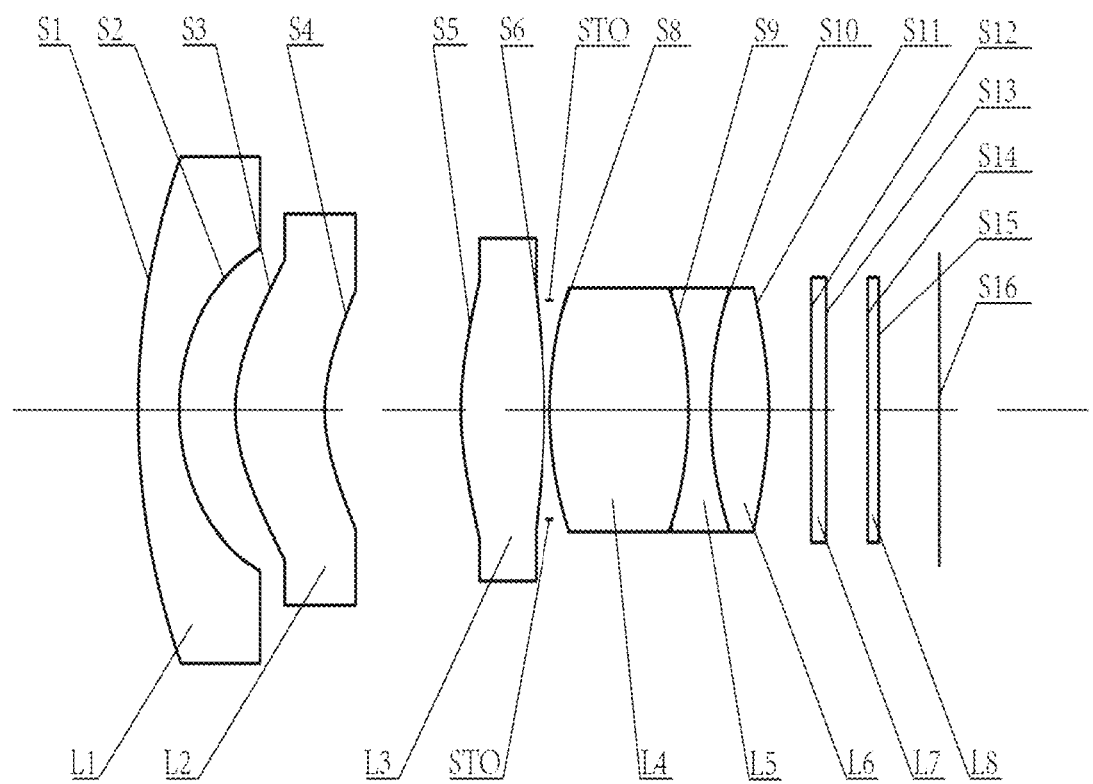
FIG. 3 is a schematic structural diagram showing an optical lens assembly according to Example 3 of the present disclosure.

An optical lens assembly according to Example 3 of the present disclosure is described below with reference to FIG. 3. FIG. 3 is a schematic structural view of the optical lens assembly according to Example 2 of the present disclosure.

As shown in FIG. 3, the optical lens assembly includes a first lens L1, a second lens L2, a third lens L3, a fourth lens L4, a fifth lens L5 and a sixth lens L6, which are sequentially arranged along an optical axis from an object side to an imaging side of the optical lens assembly.

The first lens L1 is a meniscus lens having negative refractive power, and an object-side surface S1 thereof is a convex surface and an image-side surface S2 thereof is a concave surface.

The second lens L2 is a meniscus lens having negative refractive power, and an object-side surface S3 thereof is a convex surface and an image-side surface S4 thereof is a concave surface. In addition, the second lens L2 is an aspheric lens, and its object-side surface S3 and image-side surface S4 are both aspheric.

The third lens L3 is a biconvex lens having positive refractive power, and an object-side surface S5 thereof is a convex surface and an image-side surface S6 thereof is a convex surface. In addition, the third lens L3 is an aspheric lens, and its object-side surface S5 and image-side surface S6 are both aspheric.

The fourth lens L4 is a biconvex lens having positive refractive power, and an object-side surface S8 thereof is a convex surface and an image-side surface S9 thereof is a convex surface. The fifth lens L5 is a biconcave lens having negative refractive power, and an object-side surface S9 thereof is a concave surface and an image-side surface S10 thereof is a concave surface. The sixth lens L6 is a biconvex lens having positive refractive power, and an object-side surface S10 thereof is a convex surface and an image-side surface S11 thereof is a convex surface. In addition, the sixth lens L6 is an aspheric lens, and its image-side surface S11 is aspheric. The fourth lens L4, the fifth lens L5, and the sixth lens L6 are cemented to form a triple cemented lens.

Optionally, the optical lens assembly may further include an optical filter L7 having an object-side surface S12 and an image-side surface S13, and a protective lens L8 having an object-side surface S14 and an image-side surface S15. The optical filter L7 may be used to correct color deviations. The protective lens L8 may be used to protect an image sensing chip located on an imaging plane S16. Light from an object sequentially passes through the respective surfaces S1 to S15 and is finally imaged on the imaging plane S16.

In the optical lens assembly of the present example, a stop STO may be provided between the third lens L3 and the fourth lens L4 to improve imaging quality.

Table 7 shows radius of curvature R, thickness T, refractive index Nd and Abbe number Vd of each lens of the optical lens assembly in Example 3, wherein the units for the radius of curvature R and the thickness T are millimeter (mm). Table 8 below shows the conic coefficient K and the high-order coefficients A, B, C, D and E applicable to aspheric surfaces S3, S4, S5, S6 and S11 in Example 1. Table 9 shows an optical back focal length BFL of the optical lens assembly (i.e. a distance along the optical axis from a center of the image-side surface S11 of the sixth lens L6, the last lens, to the imaging plane S16), a total focal length F of the optical lens assembly, a total track length TTL of the optical lens assembly (i.e., a distance along the optical axis from a center of the object-side surface S1 of the first lens L1 to the imaging plane S16), a maximum field-of-view FOV of the optical lens assembly, a maximum effective aperture diameter D of the object-side surface S1 of the first lens L1 corresponding to the maximum field-of-view of the optical lens assembly, and an image height H corresponding to the maximum field-of-view of the optical lens assembly in Example 3.

TABLE 7

| Surface No. | Radius of Curvature R | Thickness T | Refractive Index Nd | Abbe Number Vd |
|---|---|---|---|---|
| S1 | 17.0643 | 1.5000 | 1.80 | 46.57 |
| S2 | 4.9924 | 2.6072 | | |
| S3 | 6.5000 | 2.1808 | 1.80 | 46.57 |
| S4 | 3.7016 | 5.5775 | | |
| S5 | 14.2912 | 3.2000 | 1.74 | 49.34 |
| S6 | −9.6682 | 0.2000 | | |
| STO | Infinite | 0.0141 | | |
| S8 | 8.6441 | 5.0745 | 1.52 | 64.21 |
| S9 | −8.6441 | 0.8000 | 1.81 | 22.69 |
| S10 | 8.6441 | 1.9125 | 1.62 | 63.42 |
| S11 | −11.5649 | 1.5664 | | |
| S12 | Infinite | 0.5500 | 1.52 | 64.21 |
| S13 | Infinite | 1.5131 | | |
| S14 | Infinite | 0.4000 | 1.52 | 64.21 |
| S15 | Infinite | 1.8837 | | |
| S16 | Infinite | | | |

TABLE 8

| Surface No. | K | A | B | C | D | E |
|---|---|---|---|---|---|---|
| S3 | −1.0118 | 4.02E−04 | −3.52E−05 | 9.29E−07 | −1.15E−07 | 1.82E−09 |
| S4 | −0.9914 | 2.16E−03 | −3.47E−05 | −4.60E−06 | −4.56E−07 | 2.59E−08 |
| S5 | 2.7259 | 2.76E−04 | 2.36E−05 | −9.00E−07 | 6.36E−08 | 3.26E−10 |
| S6 | −8.8025 | −7.65E−04 | 3.34E−05 | 3.72E−06 | −3.72E−07 | 1.87E−08 |
| S11 | −2.3134 | 1.05E−03 | −1.60E−06 | 1.11E−06 | 3.84E−08 | −5.38E−09 |

TABLE 9

| Parameters | BFL(mm) | F(mm) | TTL (mm) | FOV (°) | D(mm) | H(mm) |
|---|---|---|---|---|---|---|
| Value | 5.913 | 4.184 | 28.980 | 113.7 | 14.301 | 8.738 |

In this example, the maximum field-of-view FOV of the optical lens assembly, the maximum effective aperture diameter D of the object-side surface S1 of the first lens L1 corresponding to the maximum field-of-view of the optical lens assembly, and the image height H corresponding to the maximum field-of-view of the optical lens assembly satisfy D/H/FOV=0.014. The optical back focal length BFL of the optical lens assembly and the total track length TTL of the optical lens assembly satisfy BFL/TTL=0.204. The total track length TTL of the optical lens assembly and the total focal length F of the optical lens assembly satisfy TTL/F=6.926.

In view of the above, Examples 1 to 3 respectively satisfy the relationship shown in Table 10 below.

TABLE 10

| | Example | | |
|---|---|---|---|
| Conditional | 1 | 2 | 3 |
| D/H/FOV | 0.014 | 0.014 | 0.014 |
| BFL/TTL | 0.236 | 0.231 | 0.204 |
| TTL/F | 6.074 | 6.222 | 6.926 |

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical lens assembly, comprising: a first lens, a second lens, a third lens, a fourth lens, a fifth lens and a sixth lens, which are arranged sequentially from an object side to an image side along an optical axis,
    wherein,
    the first lens has negative refractive power, an object-side surface of the first lens is a convex surface, and an image-side surface of the first lens is a concave surface;
    the second lens has negative refractive power, an object-side surface of the second lens is a convex surface, and an image-side surface of the second lens is a concave surface;
    the third lens has positive refractive power, and both of an object-side surface and an image-side surface of the third lens are convex surfaces;
    the fourth lens has positive refractive power, and both of an object-side surface and an image-side surface of the fourth lens are convex surfaces;
    the fifth lens has negative refractive power, and both of an object-side surface and an image-side surface of the fifth lens are concave surfaces; and
    the sixth lens has positive refractive power, and both of an object-side surface and an image-side surface of the sixth lens are convex surfaces,
    wherein D/H/FOV≤0.025/degree, where FOV is a maximum field-of-view of the optical lens assembly, D is a maximum effective aperture diameter of the object-side surface of the first lens corresponding to the maximum field-of-view of the optical lens assembly, and H is an image height corresponding to the maximum field-of-view of the optical lens assembly.

2. The optical lens assembly according to claim 1, wherein the fourth lens, the fifth lens and the sixth lens are cemented to form a triple cemented lens.

3. The optical lens assembly according to claim 1, wherein any one or all of the first to sixth lenses is a glass lens.

4. The optical lens assembly according to claim 1, wherein at least one of the second lens, the third lens, and the sixth lens is an aspheric lens.

5. The optical lens assembly according to claim 1, wherein D/H/FOV≤0.02/degree.

6. The optical lens assembly according to claim 1, wherein BFL/TTL≥0.15,
    where BFL is a distance along the optical axis from a center of the image-side surface of the sixth lens to an imaging plane of the optical lens assembly, and
    TTL is a distance along the optical axis from a center of the object-side surface of the first lens to the imaging plane of the optical lens assembly.

7. The optical lens assembly according to claim 6, wherein 0.236≥BFL/TTL≥0.204.

8. The optical lens assembly according to claim 1, wherein TTL/F≤7.5,
    where TTL is a distance along the optical axis from a center of the object-side surface of the first lens to an imaging plane of the optical lens assembly, and
    F is a total focal length of the optical lens assembly.

9. The optical lens assembly according to claim 8, wherein TTL/F≤7.0.

10. An optical lens assembly, comprising: a first lens, a second lens, a third lens, a fourth lens, a fifth lens and a sixth lens, which are arranged sequentially from an object side to an image side along an optical axis,
    wherein,
    each of the first lens, the second lens and the fifth lens has negative refractive power;

each of the third lens, the fourth lens and the sixth lens has positive refractive power; and the fourth lens, the fifth lens and the sixth lens are cemented to form a triple cemented lens, wherein TTL/F≤7.5, where TTL is a distance along the optical axis from a center of an object-side surface of the first lens to an imaging plane of the optical lens assembly, and F is a total focal length of the optical lens assembly, wherein D/H/FOV≤0.025/degree, where FOV is a maximum field-of-view of the optical lens assembly, D is a maximum effective aperture diameter of an object-side surface of the first lens corresponding to the maximum field-of-view of the optical lens assembly, and H is an image height corresponding to the maximum field-of-view of the optical lens assembly.

11. The optical lens assembly according to claim 10, wherein an object-side surface of the first lens is a convex surface, and an image-side surface of the first lens is a concave surface;

an object-side surface of the second lens is a convex surface, and an image-side surface of the second lens is a concave surface;

both of an object-side surface and an image-side surface of the third lens are convex surfaces; or both of an object-side surface and an image-side surface of the fourth lens are convex surfaces.

12. The optical lens assembly according to claim 10, wherein TTL/F≤7.0.

13. The optical lens assembly according to claim 10, wherein D/H/FOV≤0.02/degree.

14. The optical lens assembly according to claim 10, wherein 0.236≥BFL/TTL≥0.204, where BFL is a distance along the optical axis from a center of an image-side surface of the sixth lens to an imaging plane of the optical lens assembly, and TTL is a distance along the optical axis from a center of an object-side surface of the first lens to the imaging plane of the optical lens assembly.

15. The optical lens assembly according to claim 10, wherein both of an object-side surface and an image-side surface of the fifth lens are concave surfaces.

16. The optical lens assembly according to claim 10, wherein both of an object-side surface and an image-side surface of the sixth lens are convex surfaces.

17. The optical lens assembly according to claim 10, wherein any one or all of the first to sixth lenses is a glass lens.

18. The optical lens assembly according to claim 10, wherein at least one of the second lens, the third lens, and the sixth lens is an aspheric lens.

19. The optical lens assembly according to claim 10, wherein BFL/TTL≥0.15, where BFL is a distance along the optical axis from a center of an image-side surface of the sixth lens to an imaging plane of the optical lens assembly, and TTL is a distance along the optical axis from a center of an object-side surface of the first lens to the imaging plane of the optical lens assembly.

* * * * *